United States Patent
Ko

[11] Patent Number: 5,911,632
[45] Date of Patent: Jun. 15, 1999

[54] APPARATUS FOR CULTIVATING ORGANOVEGETABLES

[76] Inventor: Wen Tsan Ko, 1F, No. 39, Alley 11, Lane 405, Chung Hua Rd., Chu Pei City, Hsinchu Hsien, Taiwan

[21] Appl. No.: 08/965,118

[22] Filed: Nov. 6, 1997

[51] Int. Cl.[6] .............................. A01G 7/00; A01C 1/04; A01C 7/00
[52] U.S. Cl. .................. 47/5.5; 47/56; 111/199
[58] Field of Search .................. 47/5.5, 59, 60, 47/61, 62, 63, 64, 65, 14, 15, 56, 65.8, 65.9, 9, 1.01 R, 62 C; 111/199

[56] References Cited

U.S. PATENT DOCUMENTS

| | | | |
|---|---|---|---|
| 776,246 | 11/1904 | Kanst | 47/58.1 |
| 1,971,504 | 8/1934 | Pratt | 47/56 |
| 2,876,588 | 3/1959 | Tietz et al. | 47/58.1 |
| 4,318,248 | 3/1982 | Muldner | 47/56 |
| 5,421,123 | 6/1995 | Sakate et al. | 47/56 |

*Primary Examiner*—Michael J. Carone
*Assistant Examiner*—Son T. Nguyen
*Attorney, Agent, or Firm*—Pro-Techtor International Services

[57] ABSTRACT

The subject is a novel apparatus for cultivating organovegetables, which includes an organic medium layer, a vegetable seeds paper membrane, a position-fixing membrane and an insect-proof screen membrane, and which is formed by laminating in order the organic medium layer, the vegetable seeds paper membrane, the position-fixing membrane and the insect-proof screen membrane. These components of the novel apparatus can be prepared into upright rolls which can be cut and applied according to the cultivating area. The novel apparatus is used in combination with an organic medium layer therein so that it is not restricted by land condition.

5 Claims, 5 Drawing Sheets

APPARATUS FOR CULTIVATING ORGANOVEGETABLES

BACKGROUND OF THE INVENTION

1. Field of the Invention

The invention relates to a novel apparatus for cultivating organovegetables, and in particular, a novel apparatus for cultivating organovegetables which enables normal growth of vegetables by just supplying suitable amount of water without necessity to sowing, loosing earth, fertilizing and the like.

2. Description of the Prior Art

Conventional vegetable planting methods are mostly operated according to a scheme comprising of loosing earth, sowing, fertilizing, killing insects, harvesting and the like, with intervened tedious tasks as regular watering, weeds killing and the like, and thereby various vegetables can be produced for edible purpose of mankind. However, owing to the modem environmental sense and health considerations, uses of insecticide are extremely avoided, and hence organovegetables, being claimed as healthy, environmental protection, toxicless, and free of residual chemical reagents, has become the most potential and popular vegetables in the 21-th century. Furthermore, in a trend of eating PIY (plant-by-yourself) vegetables, the family fine agriculture is prevailing increasingly. Although such family fine agriculture can prevent effectively contamination of pesticides, tedious tasks such as loosing earth, fertilizing and the like are still needed during cultivating. In particular, as for fertilizing, amount of fertilizer can influence directly the growth of the plant, which leads to a problem to be eagerly solved, that is, how to let a fresh learner who is completely strange in agriculture to manage effectively the timing and dosage of fertilizing for normal growth of plants. Moreover, due to reasons stated above, growth of plants can not be effectively controlled which influences date of harvesting, and thus results in a disadvantage of irregular harvesting and hence being not able to enjoy fresh vegetables at any time.

In addition, in conventional sowing and fertilizing, seeds and fertilizers are been grasped and spreaded on the soil by hands, which not only always dirty hands after each operation, but also leads to unevenly distribution of seeds and fertilizers in the soil, which can result readily in uneven growing.

Further, traditional routes of vegetable cultivation are carried out mostly on a farm land needing a wide land area such that a land becomes essential to cultivation, and also, in some regions or countries, no fertile land can be provided for cultivating plants and vegetables due to the barren earth quality therein, and thereby, the agricultural development in such regions is limited.

SUMMARY OF THE INVENTION

Accordingly, the object of the invention is to provide a novel apparatus for cultivating organovegetables, comprising an organic medium layer, a vegetable seeds paper membrane, a position-fixing membrane and an insect-proof screen membrane layer, wherein, said organic medium layer contains an appropriate amount of organic soil or organic medium for nourishing and also being the base for cultivating organovegetable; said vegetable seeds paper membrane consists of a lower paper membrane for placing organovegetable seeds on equal distance positions thereon while leaves suitable space and distance needed for their growth, and a upper membrane which covers said seeds and said lower paper membrane by being clamped therewith; and said position-fixing membrane and said insect-proof screen membrane are used through bonding therebetween, wherein, holes corresponding to the seeds on the vegetable seeds paper membrane are provided on said position-fixing membrane for supporting and directing the growth of the vegetable; while fine venting holes are provided on said insect-proof screen membrane for passing air and water necessary for growth of vegetables and also for preventing insects.

The vegetable seeds paper membrane covers a layer of organic medium layer which provides nutrients essential to the growth of vegetable seeds. Through adequate wetting, the vegetable seeds paper membrane will break and thus vegetable seeds therein can fall spontaneously into the organic medium layer which just can supply nutrient necessary for growth of vegetables, and therefore, vegetables can grow normally by supplying merely a suitable amount of water.

The position-fixing membrane provided on said vegetable seeds paper membrane can aid and direct the growth of vegetable, and also has a effect of inhibiting the growth of weed surrounding a vegetable. Two edges of such position-fixing membrane is bonded adhesively onto corresponding lower faces of two edges of the insect-proof screen membrane. The position-fixing membrane and the insect-proof screen membrane are used in conjunction. The insect-proof screen membrane has a number of fine venting holes thereon for passing air and water necessary for the growth of vegetables.

As vegetable grows, seeds emerge through the organic medium layer and are directed and positioned by the position-fixing membrane. Thereafter, since the insect-proof screen membrane is a thin and soft membrane, vegetables can grow upwardly against the membrane during their growth without being suppressed.

In additional, components in the novel apparatus for cultivating organovegetables according to the invention, namely, an organic medium layer, a vegetable seeds paper membrane, a position-fixing membrane and an insect-proof screen membrane, are made by rolling into a form of belt and stored in a form of roll, and therefore, can be cut into a suitable size and used according to the requirement of cultivating space.

The organic medium layer used in the novel apparatus for cultivating organovegetables according to the invention can solve the problem of the land essential to the cultivation of vegetables, and can be used according to suitable place, area of cultivating region and the like as required by the cultivator. The insect-proof screen membrane can be used to prevent the growing organovegetables from damaging by insects, which is the most important topic in the cultivation of organovegetables. Folding portions of the insect-proof screen membrane can provide a space needed during the growth of organovegetables such that organovegetables can grow upwardly against the insect-proof screen membrane and will not be suppressed thereby.

While features and advantages of the invention have been described as above, it is the most outstanding in the use of the novel apparatus for cultivating organovegetables according to the invention that, it has progressiveness in that a fertilizing step can be eliminated through supplying nutrients by using the organic medium layer. Also, the organic medium layer can be prepared from garbages and wastes, which makes possible the reuse of wastes, and which constitutes the environmental protection practicability and cost saving characteristic of the invention. Furthermore, during cultivating vegetables by using the apparatus according to the invention, none of herbicides or insecticides is needed for killing weeds and preventing insects so that soils, water and environment will not be polluted, and a nice cycle can be resulted. Moreover, the novel apparatus for cultivating organovegetables according to the invention can save cost of cultivation, simplify agricultural process and solves shortness of manpower in farm as well as can prevent cultivator and farmer from risks of toxic harm and, meanwhile, mankind can benefit well from vegetables free of residual pesticides.

BRIEF DESCRIPTION OF THE DRAWINGS

The invention, as well as its many advantages, may be further understood by the following detailed description and drawings in which.

Figure 1:
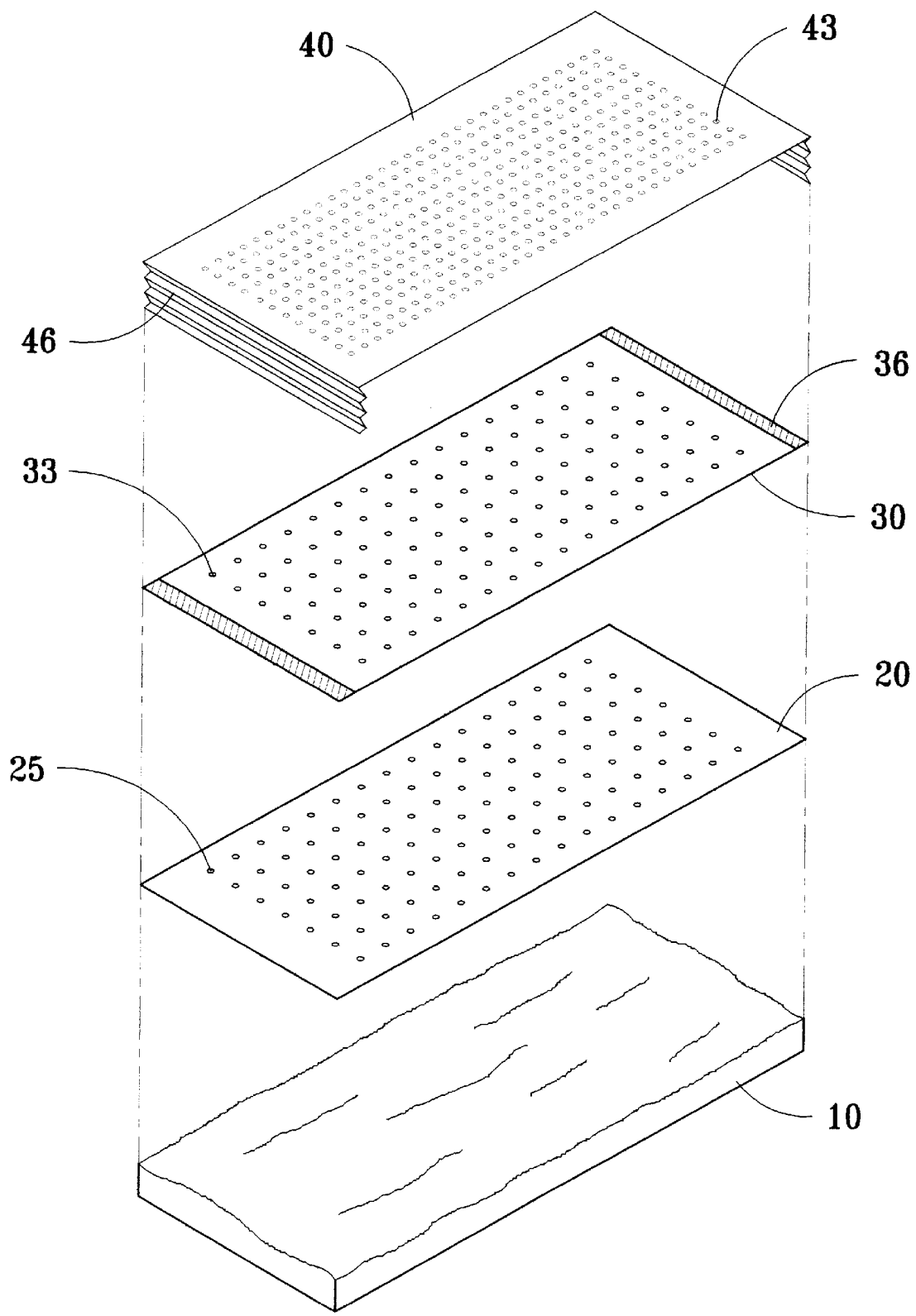
FIG. 1 is the exploded structural view of the novel apparatus for cultivating organovegetables according to the invention.

meanings of reference numerals:

| | |
|---|---|
| 10 | organic medium layer |
| 20 | vegetable seeds paper membrane |
| 25 | organovegetable seeds |
| 30 | position-fixing membrane |
| 33 | holes |
| 36 | bonding portions |
| 40 | insect-proof screen membrane |
| 43 | fine holes |
| 46 | folding portions |

DETAILED DESCRIPTION OF THE PREFERRED EMBODIMENTS

Figure 2:
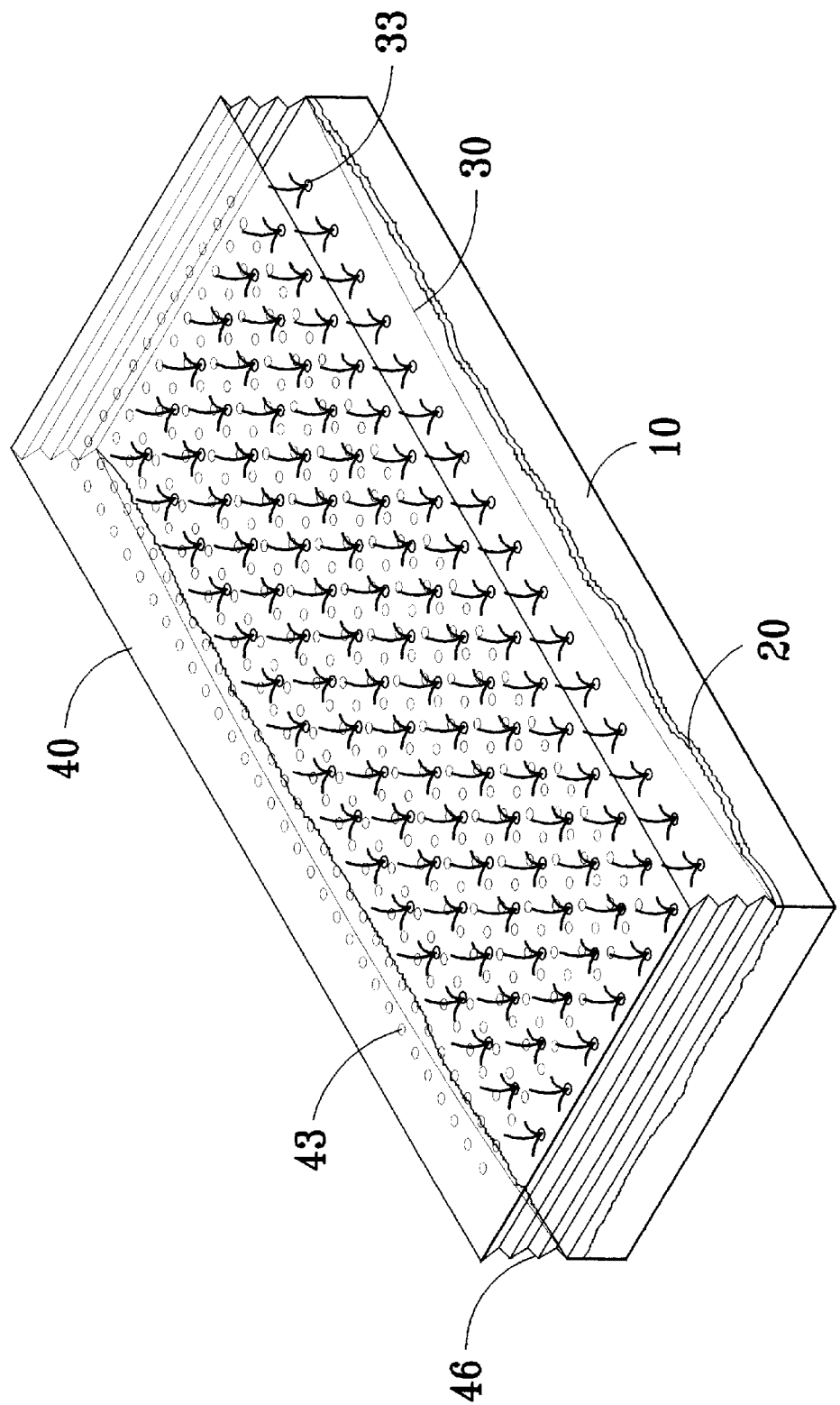
FIG. 2 is a schematic view for showing the use of the novel apparatus for cultivating organovegetables according to the invention.
Figure 3:
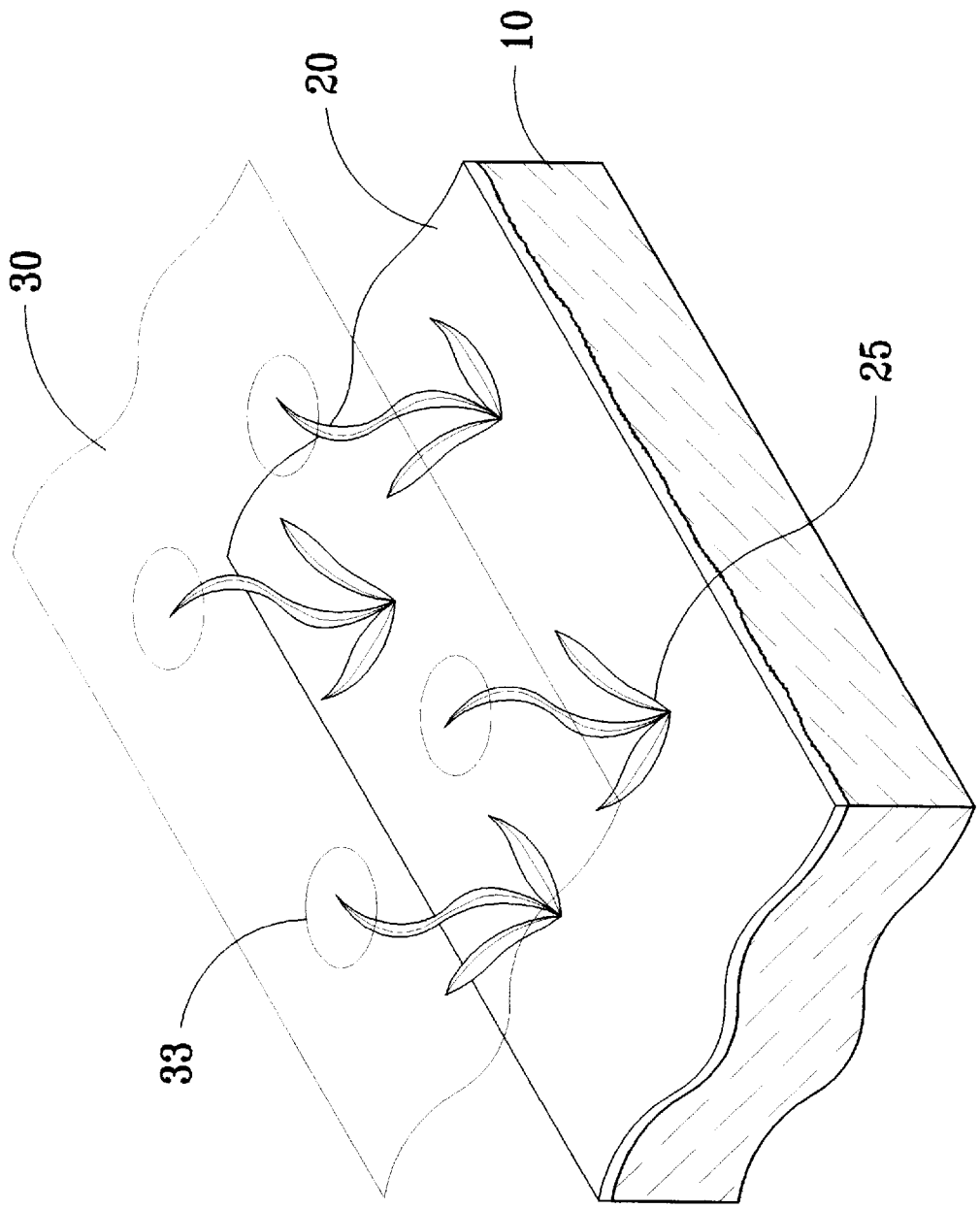
FIG. 3 is a partial enlarged schematic view of the novel apparatus for cultivating organovegetables according to the invention.

Referring to FIGS. 1 to 3, which are the exploded, assembled and partial enlarged schematic views of the novel apparatus for cultivating organovegetables according to the invention, respectively. The novel apparatus of the invention comprises components of an organic medium layer 10, a vegetable seeds paper membrane 20, a position-fixing membrane 30 and an insect-proof screen membrane 40.

Wherein, said organic medium layer 10 contains an appropriate amount of organic soil or organic medium for nourishing and also being the base for cultivating organovegetable; said vegetable seeds paper membrane 20 consists of a lower paper membrane for placing organovegetable seeds 25 on equal distance positions thereon while leaves suitable space and distance needed for their growth, and a upper membrane which covers said seeds and said lower paper membrane by being clamped therewith; and said position-fixing membrane 30 and said insect-proof screen membrane 40 are used through bonding therebetween, wherein, holes 33 corresponding to the seeds 25 on the vegetable seeds paper membrane 20 are provided on said position-fixing membrane 30 for supporting and directing the growth of the vegetable, and bonding portions 36 are provided on edges of two sides of the position-fixing membrane 30 for bonding adhesively onto the corresponding edges of the insect-proof screen membrane 40; while fine venting holes 43 are provided on said insect-proof screen membrane 40 for passing air and water necessary for growth of vegetables and also for preventing insects; and folding portions 46 are provided on two sides of the insect-proof screen membrane for providing spaces needed for growth of organovegetables during cultivating such that they can grow upwardly against the insect-proof screen membrane 40 without limiting on growth thereof.

The vegetable seeds paper membrane 20 covers a layer of organic medium layer 10 which provides nutrients essential to the growth of vegetable seeds. Through adequate wetting, the vegetable seeds paper membrane 20 will break and thus vegetable seeds 25 therein can fall spontaneously into the organic medium layer 10 which just can supply nutrients necessary for growth of vegetables, and therefore, vegetables can grow normally by supplying merely a suitable amount of water.

The position-fixing membrane 30 provided on said vegetable seeds paper membrane 20 can aid and direct the growth of vegetable. Bonding portions 36 provided on two edges of such position-fixing membrane 30 is bonded adhesively onto corresponding lower faces of two edges of the insect-proof screen membrane 40. The position-fixing membrane 30 and the insect-proof screen membrane 40 are used in conjunction. The insect-proof screen membrane 40 has a number of fine venting holes 43 thereon for passing air and water necessary for the growth of vegetables. As vegetables grow, seeds 25 emerge through the organic medium layer 10 and are directed and positioned by the position-fixing membrane 30. Thereafter, since the insect-proof screen membrane 40 is a thin and soft membrane, vegetables can grow upwardly against the membrane during their growth without being suppressed.

Figure 4B:
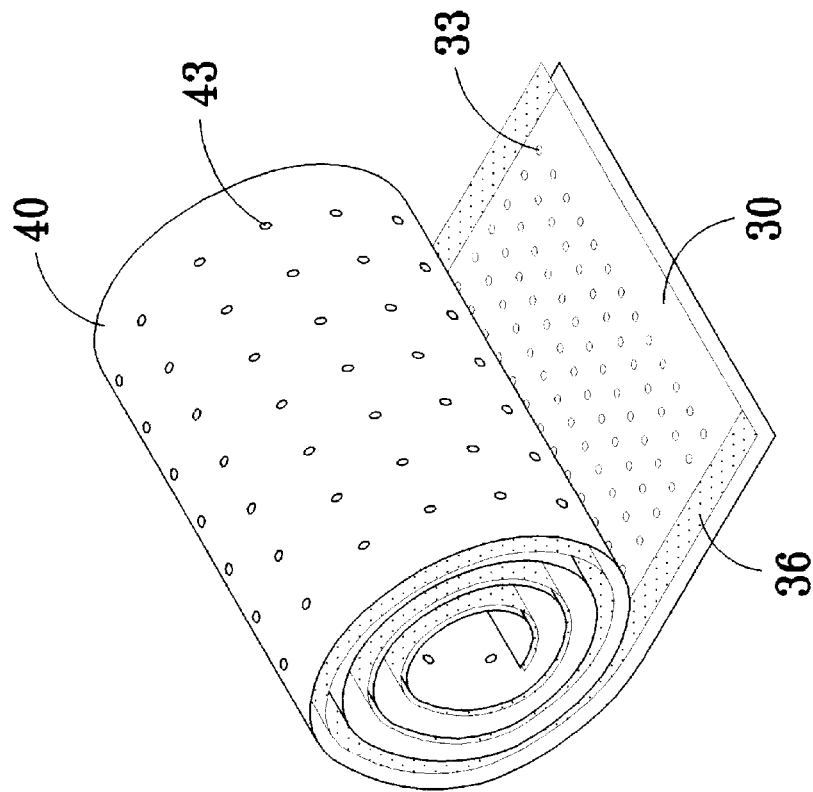
FIG. 4B is a schematic view of the position-fixing membrane and the insect-proof screen membrane which are used in the novel apparatus for cultivating organovegetables according to the invention and which are produced by rolling into a form of roll.
Figure 4A:
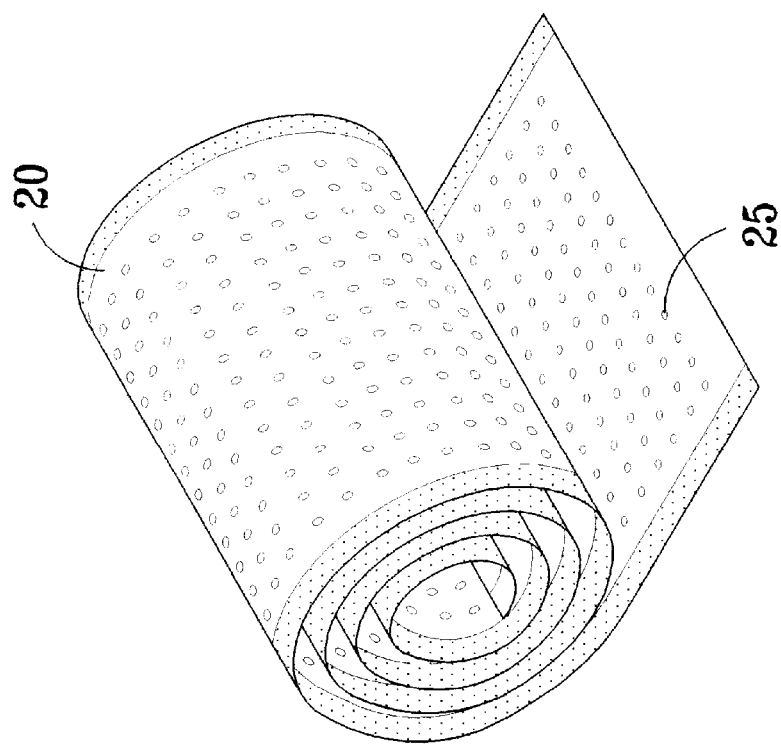
FIG. 4A is a schematic view of the vegetable seeds paper membrane which is used in the novel apparatus for cultivating organovegetables according to the invention and which is produced by rolling into a form of roll.
Figure 4C:
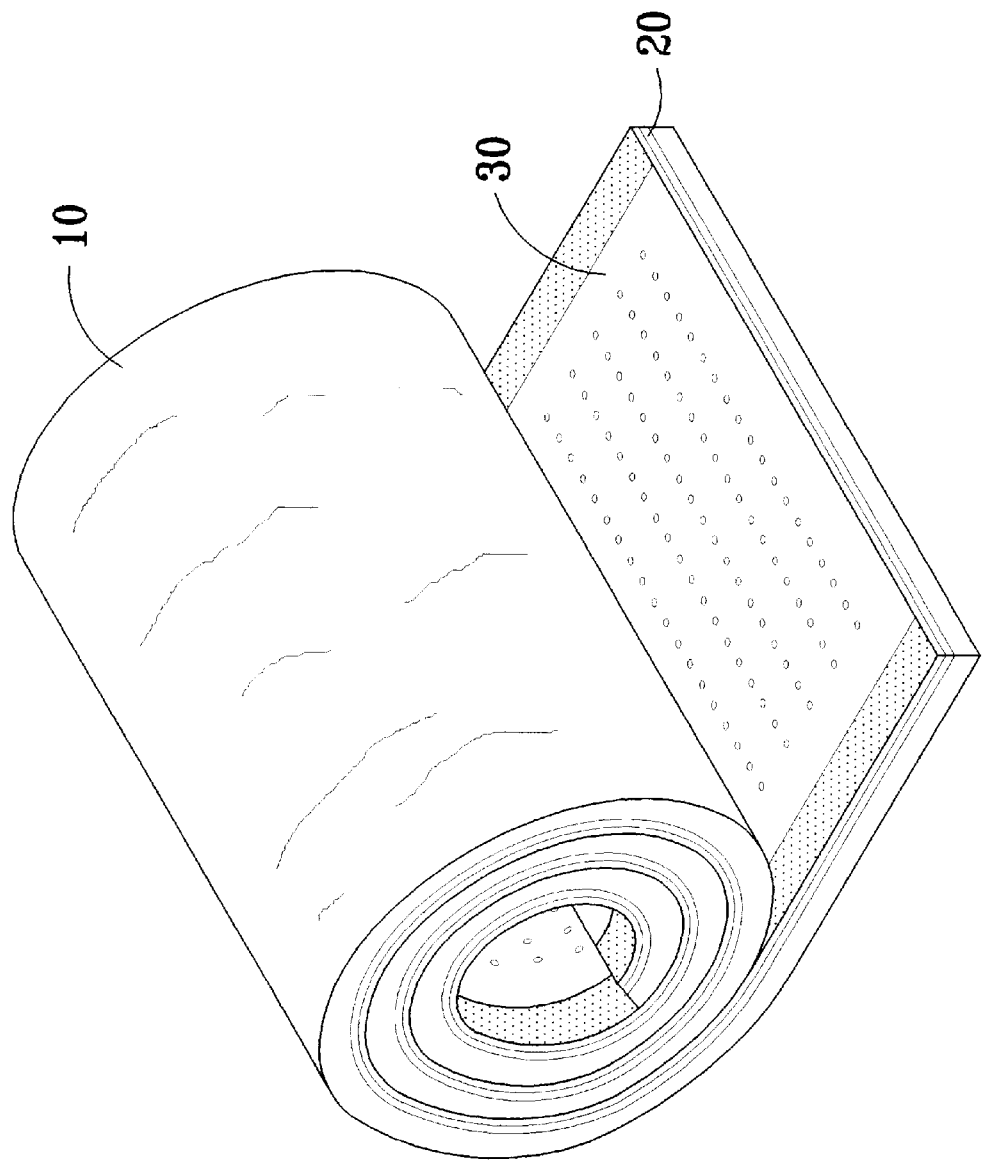
FIG. 4C is a schematic view of the novel apparatus for cultivating organovegetables according to the invention which is produced by rolling into a form of roll.

In addition, referring to FIGS. 4A, 4B and 4C, components in the novel apparatus for cultivating organovegetables according to the invention, namely, an organic medium layer 10, a vegetable seeds paper membrane 20, a position-fixing membrane 30 and an insect-proof screen membrane 40, are made by rolling into a form of belt and stored in a form of roll, and therefore, can be cut into a suitable size and used according to the requirement of cultivating space.

The organic medium layer 10 used in the novel apparatus for cultivating organovegetables according to the invention can solve the problem of the land essential to the cultivation of vegetables, and can be used according to suitable place, area of cultivating region and the like as required by the cultivator. The insect-proof screen membrane 40 can be used to prevent the growing organovegetables from damaging by insects, which is the most important topic in the cultivation of organovegetables. Folding portions 46 of the insect-proof screen membrane 40 can provide a space needed during the growth of organovegetables such that organovegetables can grow upwardly against the insect-proof screen membrane 40 and will not be suppressed thereby.

Further, fine holes 43 provided on the insect-proof screen membrane 40 according to the invention have functions as venting, insect-proof and resistance to scrubbing by heavy rain, and hence can provide vegetables good environment and conditions for growing. The insect-proof screen membrane 40 is foldable which favors use thereof by users or storing thereof when it is not used.

Accordingly, the novel apparatus for cultivating organovegetables according to the invention, when used in the cultivation of organovegetables, has the following advantages:

1. Using of the novel apparatus for cultivating organovegetables according to the invention is not limited by cultivating land, and can adapted to cultivations on deserts, stone lands or poor soils.

2. Using of the novel apparatus for cultivating organovegetables according to the invention can eliminate the step of sowing, and can carried out the cultivation by just assembling in once in the order of an organic medium layer, a vegetable seeds paper membrane, a position-fixing membrane and an insect-proof screen membrane into the apparatus according to the invention.

3. Using of the novel apparatus for cultivating organovegetables according to the invention, the insect-proof screen membrane therein has functions as venting, insect-proof, and resistance to scrubbing by heavy rain, and hence can provide vegetables good environment and conditions for growing and thereby can have a good harvest.

4. Using of the novel apparatus for cultivating organovegetables according to the invention, the step of fertilizing can be eliminated by supplying nutrients through an organic medium layer, whereby, simplify cultivating process and thus exhibits progressiveness.

5. Using of the novel apparatus for cultivating organovegetables according to the invention, the organic medium layer therein can be prepared from garbages and wastes, and thus, enables reuse of wastes, which exhibits environmental protection practicability and cost saving.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A novel apparatus for cultivating organovegetables, comprising:

- an organic medium layer containing organic soil or organic medium, said organic medium layer being formed as an upright roll;
- a vegetable seeds paper membrane consisting of a lower paper membrane having one or more vegetable seeds disposed thereon, and an upper paper membrane bonding onto and covering said lower paper membrane, said vegetable seeds paper membrane being formed as an upright roll;
- a position-fixing membrane having holes provided thereon which correspond to the vegetable seeds on said vegetable seeds paper membrane, and having bonding portions provided on two sides thereof; said position-fixing membrane being formed as an upright roll;
- an insect-proof screen membrane, said insect-proof membrane being a fine mesh screen having a plurality of fine holes, and said insect-proof membrane being formed as an upright roll, two sides thereof being able to fold into folding portions; wherein
- during cultivating, placing said vegetable seeds paper membrane having vegetable seeds adsorbed thereon directly onto the surface of said organic medium layer, wetting said paper membrane sufficiently with water to break said paper membrane, and then covering a cultivating region by placing simultaneously both said position-fixing membrane and said insect-proof screen membrane thereon to guide a growth direction of vegetables and to provide insect-proofing and wind resistance.

2. The novel apparatus for cultivating organovegetables as in claim 1, wherein said vegetable seeds paper membranes are bonded by organic fertilizer.

3. The novel apparatus for cultivating organovegetables as in claim 1, wherein a plurality of kinds of vegetable seeds are held in said vegetable seeds paper membrane.

4. The novel apparatus for cultivating organovegetables as in claim 1, wherein a space is provided between said position-fixing membrane and said insect-proof screen membrane to facilitate air circulation and water flow.

5. The novel apparatus for cultivating organovegetables as in claim 1, wherein said insect-proof screen membrane, said position-fixing membrane, said vegetable seeds paper membrane and said organic medium layer are formed as arid upright rolls, and thus can be easily cut and applied to conform to an actual cultivating area.

* * * * *